United States Patent
Joung et al.

(10) Patent No.: US 9,565,134 B2
(45) Date of Patent: Feb. 7, 2017

(54) LONG TERM EVOLUTION FEMTOCELL BASED CONTENT SERVICE SYSTEM, AND DRIVING METHOD THEREOF

(71) Applicant: INNOWIRELESS CO., LTD., Gyeonggi-do (KR)

(72) Inventors: Jin Soup Joung, Gyeonggi-do (KR); Seung-Hwan Ji, Gyeonggi-do (KR); Hong Gil Kim, Gyeonggi-do (KR)

(73) Assignee: INNOWIRELESS CO., LTD. (KR)

( * ) Notice: Subject to any disclaimer, the term of this patent is extended or adjusted under 35 U.S.C. 154(b) by 83 days.

(21) Appl. No.: 14/498,195

(22) Filed: Sep. 26, 2014

(65) Prior Publication Data
US 2015/0092664 A1    Apr. 2, 2015

(30) Foreign Application Priority Data
Sep. 27, 2013   (KR) .......................... 10-2013-0115453

(51) Int. Cl.
*H04L 12/933* (2013.01)
*H04W 24/00* (2009.01)
*H04W 84/04* (2009.01)

(52) U.S. Cl.
CPC .............. *H04L 49/15* (2013.01); *H04W 24/00* (2013.01); *H04W 84/045* (2013.01)

(58) Field of Classification Search
CPC .... H04W 24/00; H04W 84/045; H04W 4/021; H04W 64/003; H04W 72/0413; H04W 84/12; H04W 76/023; H04L 49/15; H04L 47/70; G06F 9/5027; Y02B 60/142
See application file for complete search history.

(56) References Cited

U.S. PATENT DOCUMENTS

| | | | |
|---|---|---|---|
| 2010/0227611 A1* | 9/2010 | Schmidt | H04W 4/06 455/434 |
| 2011/0110327 A1* | 5/2011 | Ramachandran | H04W 8/205 370/331 |
| 2012/0106370 A1* | 5/2012 | Radulescu | H04W 36/0083 370/252 |
| 2013/0078925 A1* | 3/2013 | Aguirre | H04W 4/021 455/62 |
| 2014/0038654 A1* | 2/2014 | Ahmadi | H04L 47/70 455/509 |

(Continued)

FOREIGN PATENT DOCUMENTS

| | | |
|---|---|---|
| KR | 1020110033667 A | 3/2011 |
| KR | 1020110063960 A | 6/2011 |
| WO | 2009045317 A2 | 4/2009 |

*Primary Examiner* — Yee Lam
(74) *Attorney, Agent, or Firm* — Keplan Breyer Schwarz & Ottesen, LLP

(57) ABSTRACT

Provided is a long term evolution (LTE) femtocell based content service system and a driving method thereof, which include user equipment (UE) connected to an evolved packet core (EPC) network that is a core network through routes, that is, a radio network subsystem (RNS) and a home eNode subsystem (HeNS) having a femtocell and a content service server connected to the EPC network and configured to receive system information including PCI, U_DL BW, Cell ID, TAC, HeNB Name and SNR, and query data from the user equipment (UE), retrieve corresponding content with reference to the received system information and query data, and provide the corresponding content to the user equipment (UE).

7 Claims, 18 Drawing Sheets

(56) References Cited

U.S. PATENT DOCUMENTS

2015/0043390 A1* 2/2015 Wang .................... H04W 24/02
 370/280
2015/0156621 A1* 6/2015 Mueck ................. H04J 11/0069
 370/328

* cited by examiner

| System Information Broadcasted from HeNB | | |
|---|---|---|
| | Characteristics | Main information |
| MIB | Essential information for UE connecting to cell | DL Bandwidth, SFN, PHICH configuration |
| SIB 1 | Providing information regarding whether connection to cell is permitted, and defining scheduling of other SIBs | Access restriction info, Cell selection info, Scheduling information on other SIBs |
| SIB 2 | Configuration information on radio resource common to all UEs. | Common/shared channel info (RACH, BCCH, PCCH, PRACH, PDSCH, PUSCH, PUCCH, Sounding RS, UL Power Control), MBSFN Sub-frame |
| SIB 3 | Information needed when terminal in idle state reselect cell | q-Hyst, s-IntraSearch, s-NonIntraSearch, q-RxLevMin, Cell reselection priority, t-ReselectionEUTRA |
| SIB 4 | neighbor cell information for reselecting cell using the same frequency band | Neighbor cell list, Black cell list, PCI for CSG |
| SIB 5 | frequency and neighbor cell information for reselecting cell using different frequency band | Supported E-UTRA frequency list (E-UTRA frequency, Neighbor cell list, Black cell list, Reselection threshold) |
| SIB 6/7/8 | Information for reselecting inter-RAT cell | |
| SIB 9 | Hone eNB name information | HeNB name |
| SIB 10 | ETWS* primary notification | * Earthquake and Tsunami Warning System |
| SIB 11 | ETWS* secondary notification | |
| SIB 12(R9) | CMAS** notification | **Commercial Mobile Alert Service |
| SIB 13(R9) | information needed to obtain MBMS control information | MCCH config. (MCCH offset, MCCH repetition/update period, SF allocation information) |
| SIB 14(R11) | EAB*** parameters | ***Extended Access Barring |
| SIB 15(R11) | MBMS Service Area ID (SAI) information | neighbor frequencies providing MBMS service, MBMS SAIs |
| SIB 16(R11) | Information regarding GPS time and Coordinated universal time (UTC) | Day light saving time, GPS time, UTC, Local time offset |

Figure 9

| Resolution | Format | Bit Rate [Mbps] | C_DL BW [MHz] |
|---|---|---|---|
| 1920×1080 | MP4 | 16.7 | 20 |
| 1920×1080 | MOV | 14.7 | 15 |
| 1920×1080 | WMV | 10.3 | 15 |
| 1920×1080 | MPEG-2 TS (BDAV) | 9 | 10 |
| 1920×1080 | FLV | 6 | 10 |
| 640×480 | MKV(H.264+AAC) | 2 | 3 |
| 800×432 | XviD+MP3 | 1.5 | 3 |
| 640×344 | XviD+MP3 | 2 | 3 |
| 624×352 | XviD+MP3 | 2 | 3 |

Figure 15

LONG TERM EVOLUTION FEMTOCELL BASED CONTENT SERVICE SYSTEM, AND DRIVING METHOD THEREOF

CROSS-REFERENCE TO RELATED APPLICATION

This application claims priority to and the benefit of Korean Patent Application No. 10-2013-0115453, filed on Sep. 27, 2013, the disclosure of which is incorporated herein by reference in its entirety.

BACKGROUND

1. Field of the Present Invention

The present invention relates to a long term evolution (LTE) femtocell based content service system and a driving method thereof, which connect a user equipment (UE) to an evolved packet core (EPC) network that is a core network through routes, that is, a radio network subsystem (RNS) and a home eNode subsystem (HeNS) having a femtocell and selectively provide a small amount of data including, for example, text, an image, and the like and a large amount of data including, for example, a high definition image to the user equipment (UE) through a femtocell network.

2. Discussion of Related Art

As a background technology of an LTE femtocell based content service system and a driving method thereof according to an embodiment of the present invention, there is a method for authenticating mobile units attached to a femtocell in communication with a secure core network such as an Internet protocol (IP) multimedia subsystem (IMS), which is disclosed in PCT International Publication No. WO2009/045317 A2, as shown in FIG. 1. This technology is directed to a method involving a femtocell in communication with a secure core network such as an IP multimedia subsystem (IMS) network and may include receiving, from the femtocell and at a first security entity in the IMS network, a global challenge including information indicating a random number, receiving an authentication response computed by a mobile unit based on the random number and a first key known by the mobile unit and not known by the femtocell; and determining, at the first secure entity, that the random number is a legitimate random number provided to the femtocell by the IMS network.

As another background technology of the present invention, there is a femtocell base station, a mobile station, and a playback device for a multimedia service and a multimedia service system using a femtocell base station, which is disclosed in Korean Patent Application Publication No. 10-2011-0063960, as shown in FIG. 2. This technology is directed to a femtocell base station, a mobile station, and a playback device for a multimedia service and a multimedia service system using a femtocell base station and may include a femtocell base station configured to provide multimedia data using an Internet protocol (IP) network, a mobile communication terminal configured to receive the multimedia data from the femtocell base station, and a playback device configured to play back the multimedia data in cooperation with the mobile communication terminal, thus providing a play back device at home with a high-speed Internet service and a mobile communication service through the mobile communication terminal based on a femtocell technology.

As still another background technology of the present invention, there are an apparatus and method for providing a multimedia broadcast multicast service in a communication system, which is disclosed in Korean Patent No. 10-1081828, as shown in FIG. 3. This technology is directed to an apparatus and method for providing a multimedia broadcast multicast service (MBMS) in a communication system and include a content storage unit configured to store pieces of multimedia content to be provided within a region of a femtocell, an MBMS emulator configured to receive the pieces of multimedia content from the content storage unit and perform MBMS emulation for providing MBMS at the femtocell base station irrespectively of whether to receive the MBMS from the core network to generate pieces of similar MBMS content corresponding to the pieces of multimedia content, and an MBMS provision unit configured to provide the pieces of similar MBMS content delivered from the MBMS emulator to at least one user equipment within the femtocell.

SUMMARY OF THE PRESENT INVENTION

The present invention is directed to a long term evolution (LTE) femtocell based content service system and a driving method thereof, which connect a user equipment (UE) to an evolved packet core (EPC) network that is a core network through routes, that is, a radio network subsystem (RNS) and a home eNode subsystem (HeNS) having a femtocell, receive system information including PCI, U_DL BW, Cell ID, TAC, HeNB Name and SNR, and query data from the user equipment (UE) to selectively provide a small amount of data including, for example, text, an image, and the like and a large amount of data including, for example, a high definition image to the user equipment (UE) through a femtocell network.

According to an aspect of the present invention, there are provided an LTE femtocell based content service system and a driving method thereof, which include a user equipment (UE) connected to an EPC network that is a core network through routes, that is, a radio network subsystem (RNS) and a HeNS having a femtocell and a content service server connected to the EPC network and configured to receive system information including PCI, U_DL BW, Cell ID, TAC, HeNB Name and SNR, and query data from the user equipment (UE), retrieve corresponding content with reference to the received system information and query data, and provide the corresponding content to the user equipment (UE).

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 9 is a view showing an overview of 3GPP LTE system information;

FIG. 15 is a view showing an example of corresponding content to a content downlink bandwidth according to an embodiment of the present invention;

DETAILED DESCRIPTION OF EXEMPLARY EMBODIMENTS

The following merely illustrates the principles of the present invention. It will thus be appreciated that those skilled in the art will be able to devise numerous other arrangements which embody the principles of the present invention and thus are within the spirit and scope of the present invention. In addition, all conditional terms listed herein and understood that the embodiments is intended only for the purpose of, in principle, to understand the concept of the present invention is clearly not limited to the embodiment and state specifically enumerated. In addition, the principles of perspective and an embodiment of the present invention, as well as to enumerate the specific embodiments is intended to include the structural and functional equivalents of these considerations, a detailed description of all is to be understood.

The above-described objects, characteristics, and advantages will be more apparent by the following detailed description with reference to the accompanying drawings. Moreover, detailed descriptions related to well-known functions or configurations will be ruled out in order not to unnecessarily obscure subject matters of the present invention. Preferred embodiments of the present invention will be described below in more detail with reference to the accompanying drawings.

Figure 1:
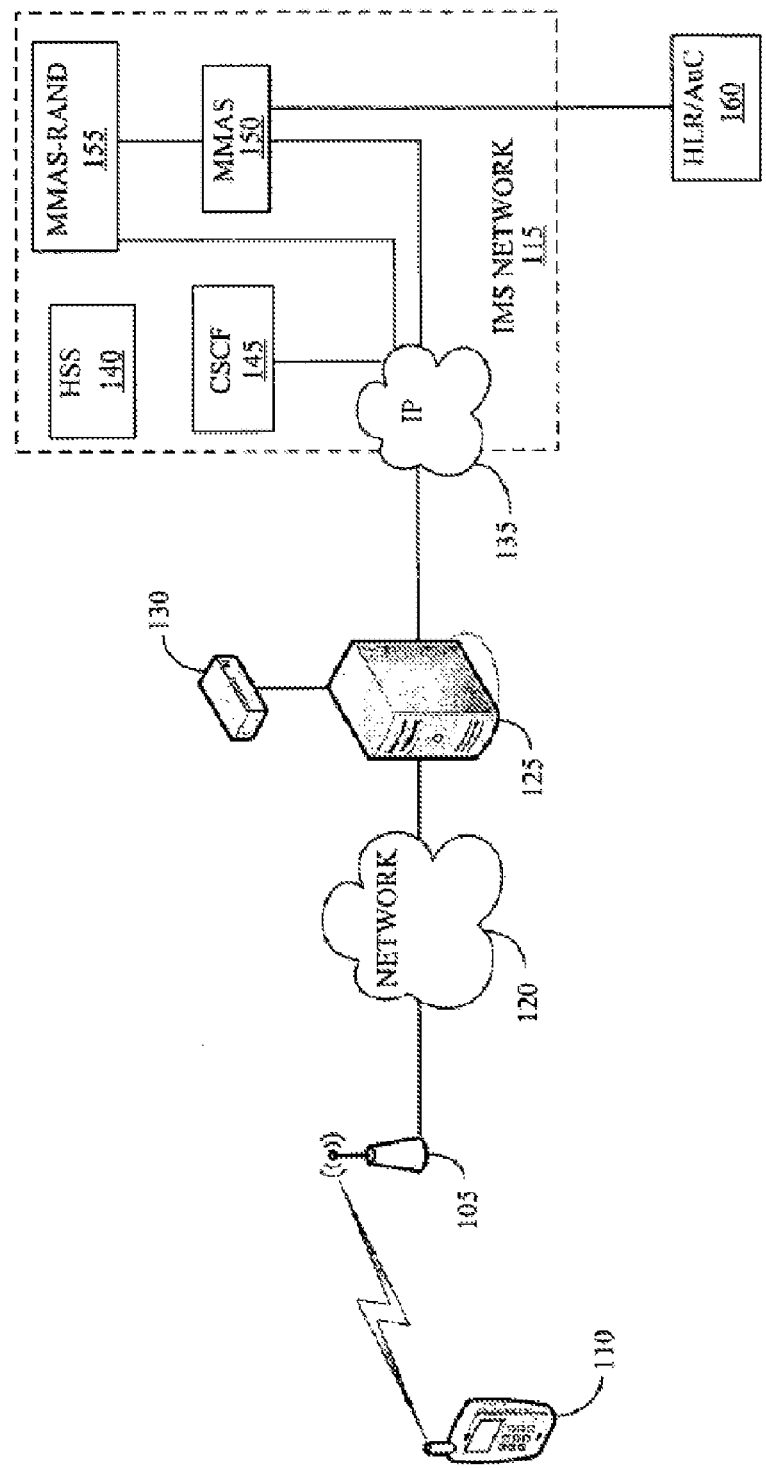
FIG. 1 is a view showing, as a background technology of the present invention, a method for authenticating mobile units attached to a femtocell in communication with a secure core network such as an IMS.
Figure 2:
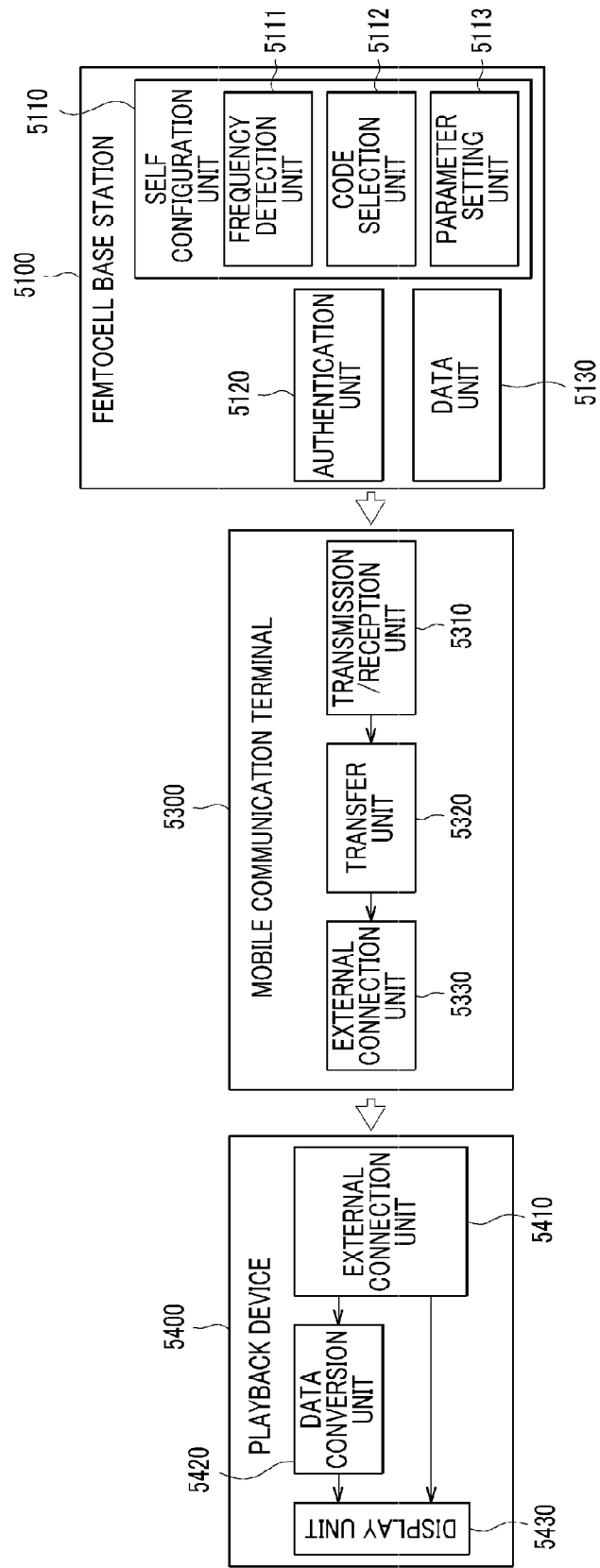
FIG. 2 is a view showing, as another background technology of the present invention, configurations of a femtocell base station, a mobile communication terminal, and a playback device for a multimedia service and a multimedia service system using the femtocell base station.
Figure 3:
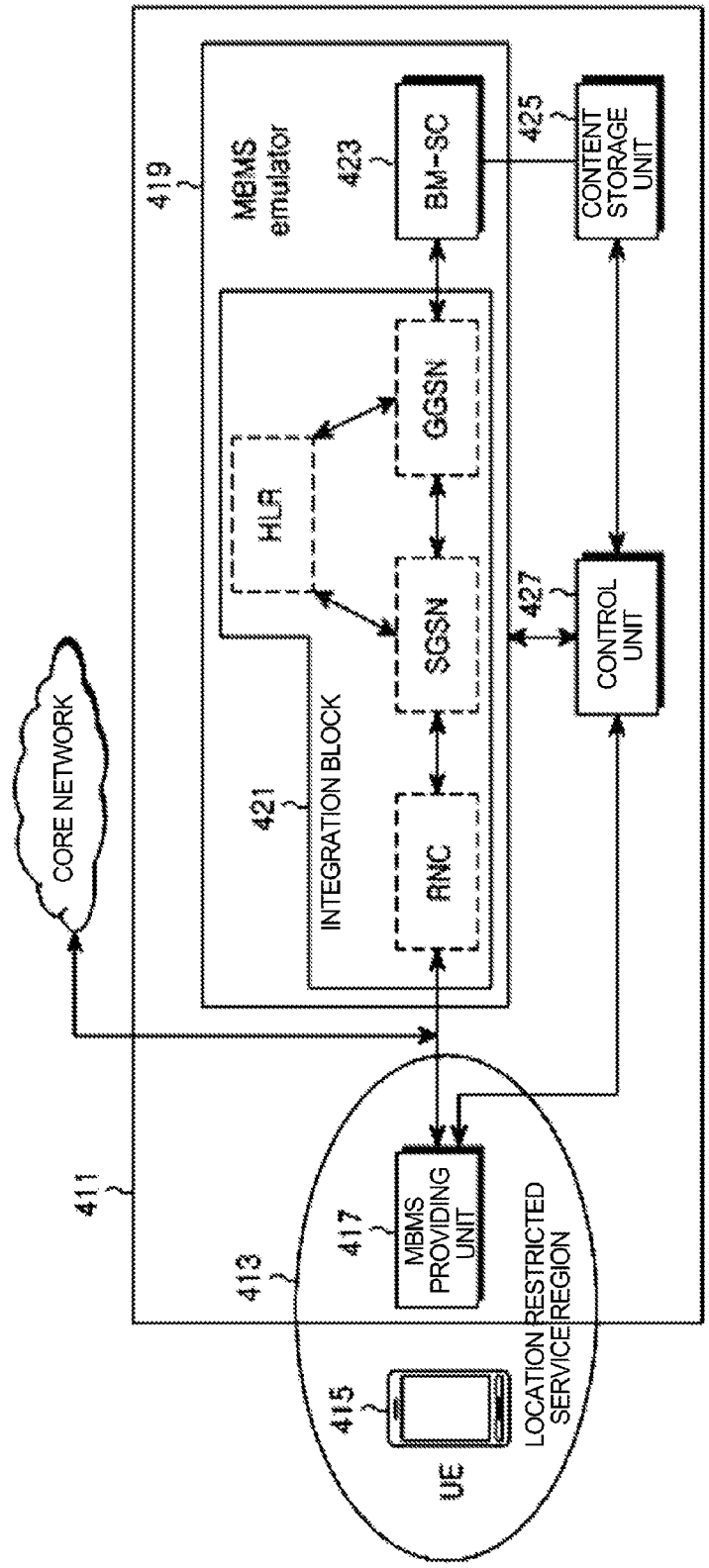
FIG. 3 is a view showing, as still another background technology of the present invention, a configuration of an apparatus and method for providing a multimedia broadcast multicast service in a communication system.
Figure 4:
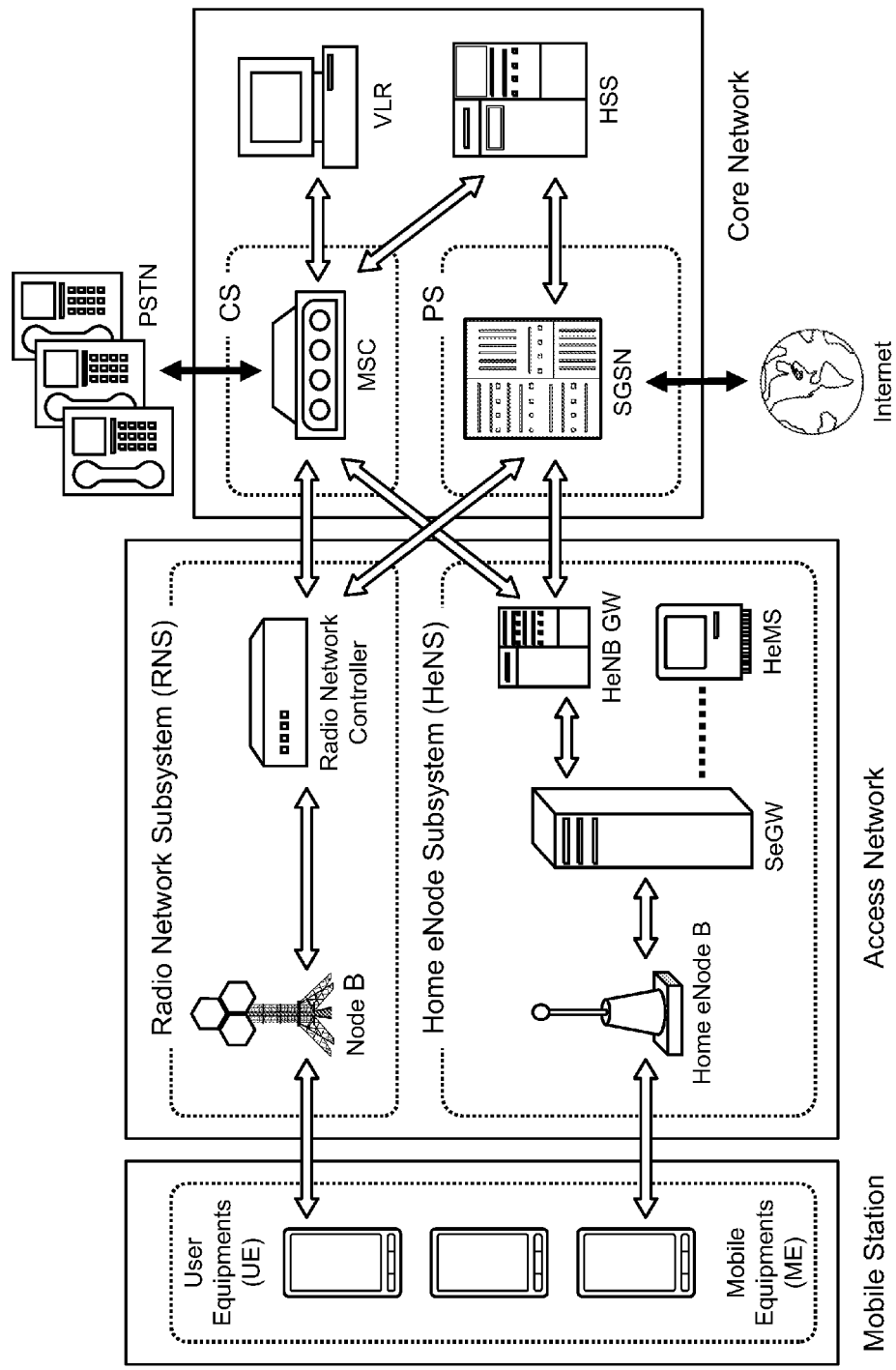
FIG. 4 is a view showing an example of configurations of an E-UTRAN and an LTE femtocell of 3GPP.

FIG. 4 is a block diagram showing exemplary configurations of an evolved universal terrestrial radio access network (E-UTRAN) and an LTE femtocell of 3GPP. A user equipment (UE) or a mobile station having a mobile equipment (ME) positioned therein is connected to the Internet and a general telephone network (a public switched telephone network (PSTN)) via a core network through an access network. The access network includes a radio network subsystem (RNS) having a Node B, which is a mobile communication base station, and a radio network controller (RNC), which is a network controller of the Node B; and a home eNode subsystem (HeNS).

In 3GPP, a femtocell is referred to as a Home Node B, a femtocell station for WCDMA is referred to as a Home Node B (HNB), and a femtocell station for LTE is referred to as a Home eNode B (HeNB). In the drawing, the home eNode subsystem (HeNS) includes a HeNB to which a user equipment (UE) is wirelessly connected, a security gateway (SeGW), and a HeNB gateway (HeNB GW) for allowing a large number of HeNBs to be connected to a core network. The security gateway (SeGW) is provided with a HeNB management system (HeMS) to operate and manage a femtocell base station. The HeNB management system is configured to provide a function of automatically setting a configuration of a base station (Self-Configuration) and a function of automatically setting a base station operating information (Self-Optimization).

The core network includes a circuit switching (CS) type and a packet switching (PS) type 3rd generation core networks (3G CNs) and an evolved packet core (EPC) network for connecting the user equipment (UE) to a public data network in a packet switching manner. In the core network, a visitor location register (VLR) having location information of a Node B cell and a HeNB subscriber server (Home Subscriber Server; HSS) are operatively connected to provide information on a location of the user equipment (UE) and information on a connection to a specific femtocell.

The radio network controller (RNC) provided in the radio network subsystem (RNS) of the access network and the HeNB gateway (HeNB GW) provide in the home eNode subsystem (HeNS) are connected to the 3rd generation network (3G CN) and the evolved packet core (EPC) network of the core network, respectively, and thereby the user equipment (UE) is connected to the Internet and a general telephone network (a public switched telephone network (PSTN)) via the access network and the core network to receive the PSTN and Internet service.

Figure 5:
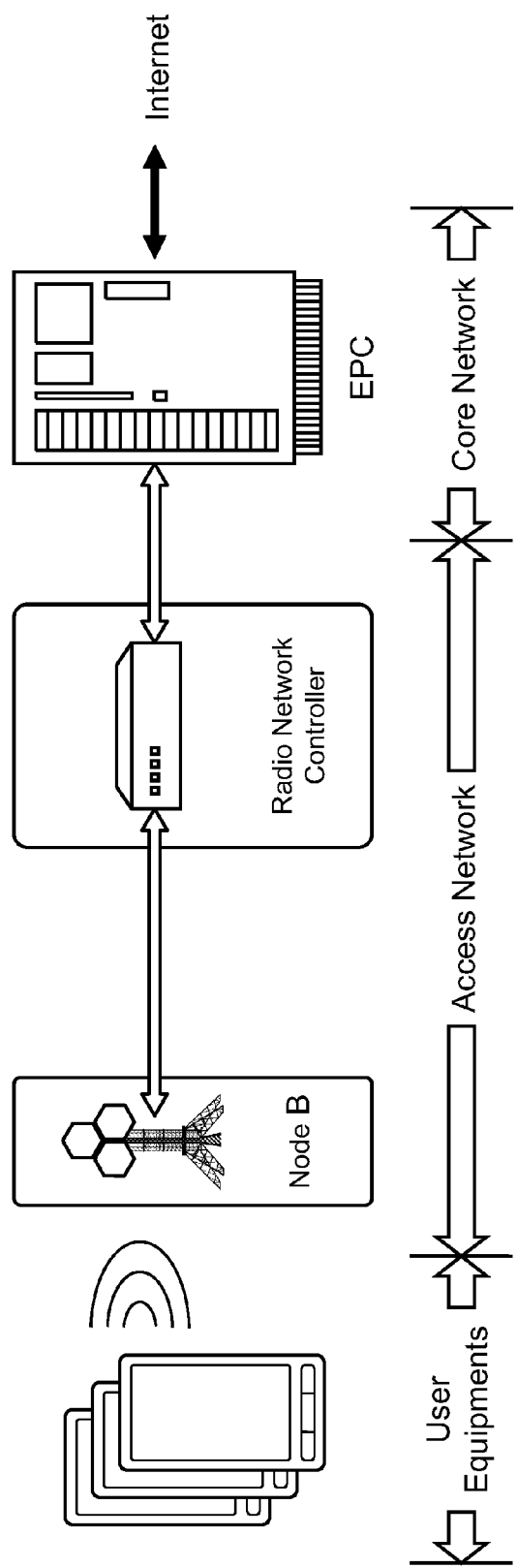
FIG. 5 is a view showing a connection to a core network through an RNS of an access network.

FIG. 5 shows a connection to a core network through a radio network subsystem (RNS) of a 3GPP access network. A connection structure in the drawing shows a PSTN and Internet service structure for the user equipment (UE) that is connected to an evolved packet core (EPC) network as the core network through a radio network subsystem (RNS) having a Node B, which is a mobile communication base station, and a radio network controller (RNC), which is a network controller of the Node B.

Figure 6:
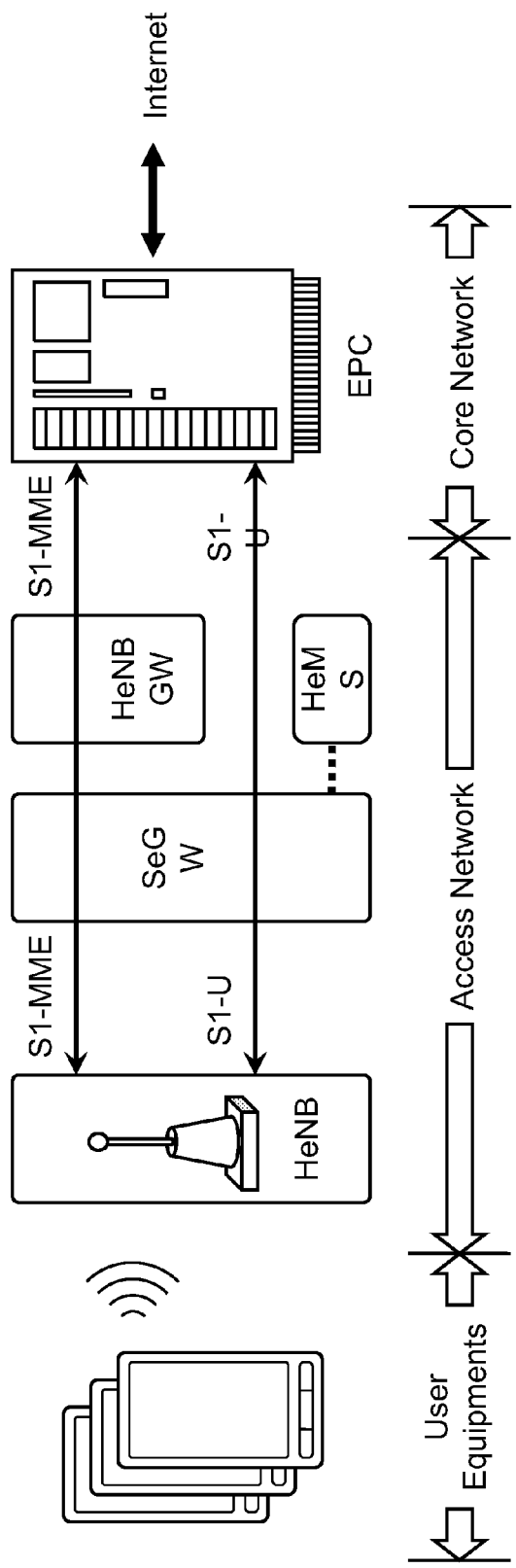
FIG. 6 is a view showing a connection to a core network through an HeNS.

FIG. 6 shows a connection to a core network through a home eNode subsystem (HeNS) in an evolved universal terrestrial radio access network (E-UTRAN) structure of the 3GPP. In the connection structure in the drawing, the home eNode subsystem (HeNS) includes a HeNB to which a user equipment (UE) is wirelessly connected, a security gateway (SeGW), and a HeNB gateway (HeNB GW) for allowing a large number of HeNBs to be connected to a core network. The security gateway (SeGW) is provided with a HeNB management system (HeMS) to operate and manage a femtocell base station.

Figure 7:
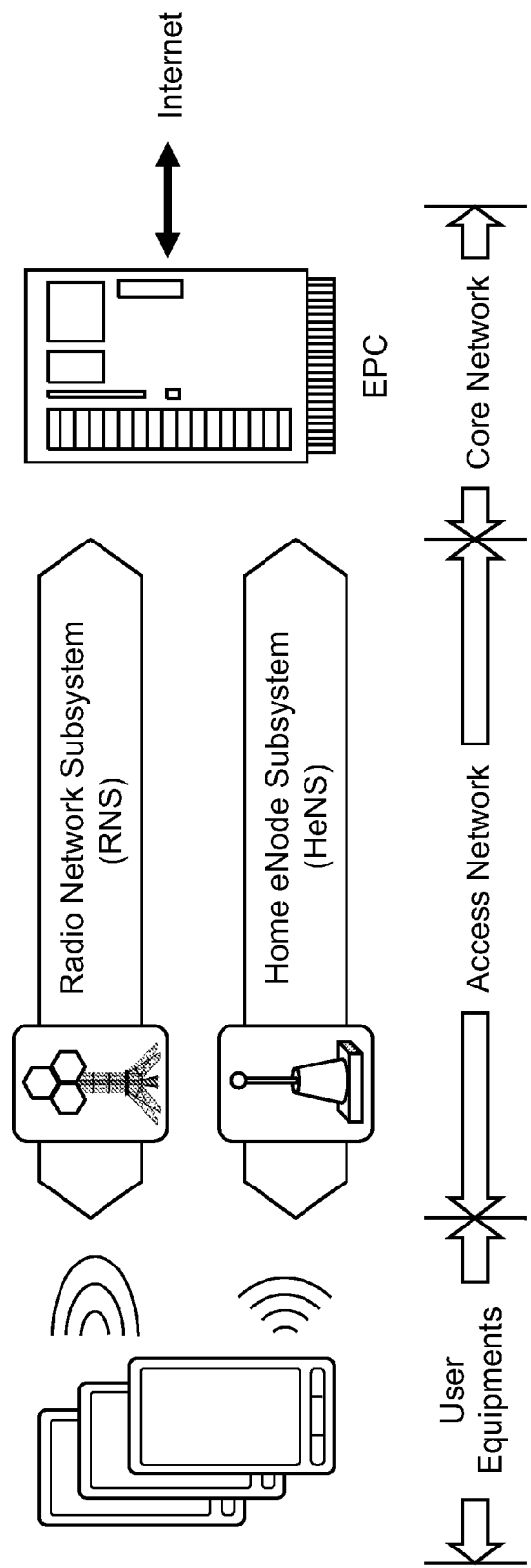
FIG. 7 is a simplified block diagram showing configurations of an E-UTRAN and an LTE femtocell.

FIG. 7 is a view schematically showing a configuration of an LTE femtocell and an evolved universal terrestrial radio access network (E-UTRAN) of 3GPP in FIG. 4. A user equipment (UE) is connected to an evolved packet core (EPC) network that is a core network through two routes, that is, a radio network subsystem (RNS) and a home eNode subsystem (HeNS) including a femtocell to receive a PSTN for the user equipment (UE) and an Internet service.

Figure 8:
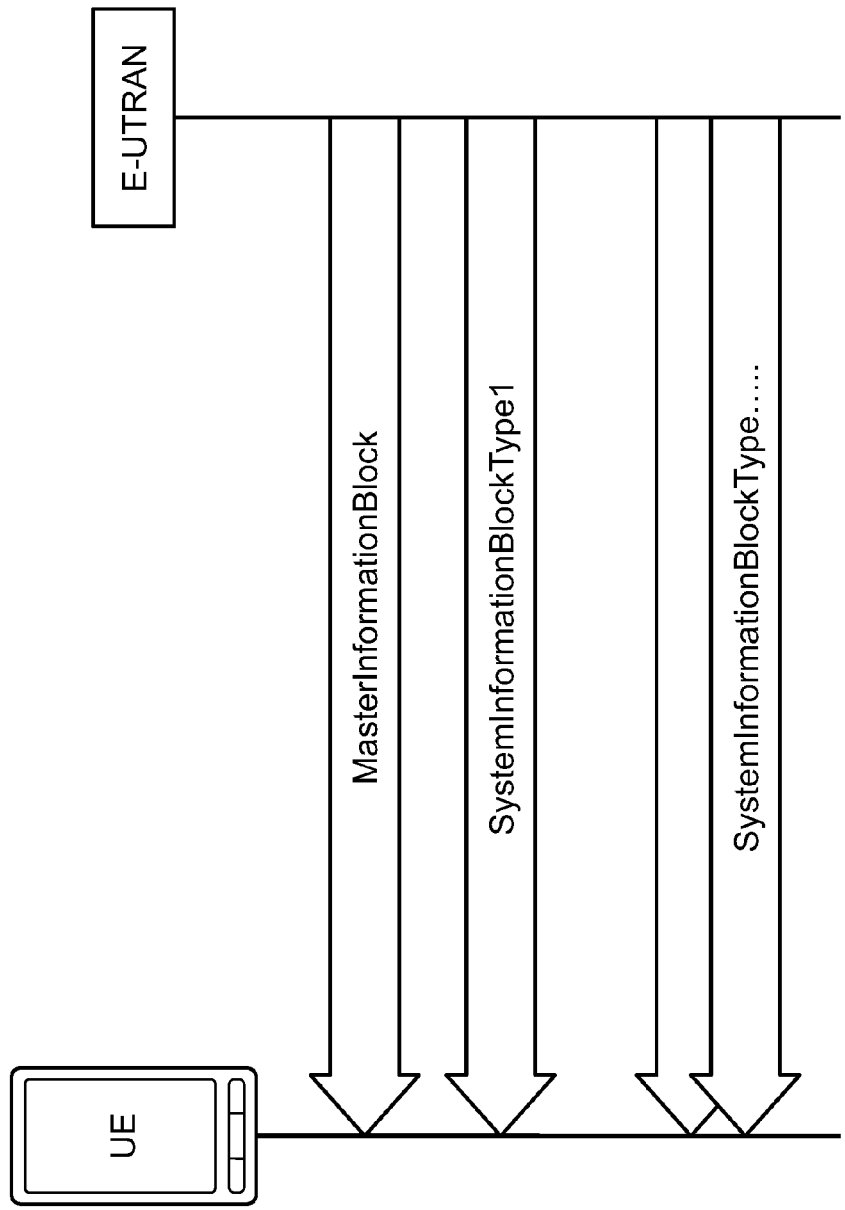
FIG. 8 is a view showing a flow of information that is provided from an E-UTRAN to an LTE user equipment.

FIG. 8 is a view showing a flow of information that is provided from an E-UTRAN in order to configure a system of a user equipment (UE) within an LTE femtocell. The LTE femtocell is a small-sized base station and has a structure for connecting to the E-UTRAN that is frequently changed according to movement of the user equipment (UE). To this end, the 3GPP defines a MIB (Master Information Block) and a plurality of SIBs (System Information Blocks) for configuring a system, allowing the E-UTRAN to periodically transmit the MIB and the SIBs to the user equipment (UE) and allowing the user equipment (UE) to change the connection structure based on the system information even in an operation state and an idle state.

FIG. 9 is a view showing an overview of system information that is provided to a user equipment (UE) from the HeNB of the 3GPP E-UTRAN. The present invention provides LTE femtocell-based information from a content service server using the system information that is provided to the user equipment (UE). Representative parameters of pieces of 3GPP system information used in the present invention are as follows.

PCI (Physical Cell ID): an identifier of a femtocell station (base station)

DL BW in MIB: a maximum bandwidth capable of downlink transmission to user equipment. DL throughput is calculated according to DL BW, the number of antennas used, and a modulation scheme. Accordingly, in order to calculate a maximum amount of data, information on the number of antennas used may be referred to.

Cell ID in SIB1: an ID of a base station in which a user equipment is positioned. Each bit is allocated by a business operator.

TAC in SIB1: a group unit of femtocell stations (base stations), which is used to find a region in which a terminal is positioned.

HeNB Name in SIB9: a name of HeNB

SNR: a signal-to-noise ratio between the femtocell station and the user equipment (UE) 100, which may be extracted through a DL signal and channel information that are received by the user equipment (UE).

Figure 10:
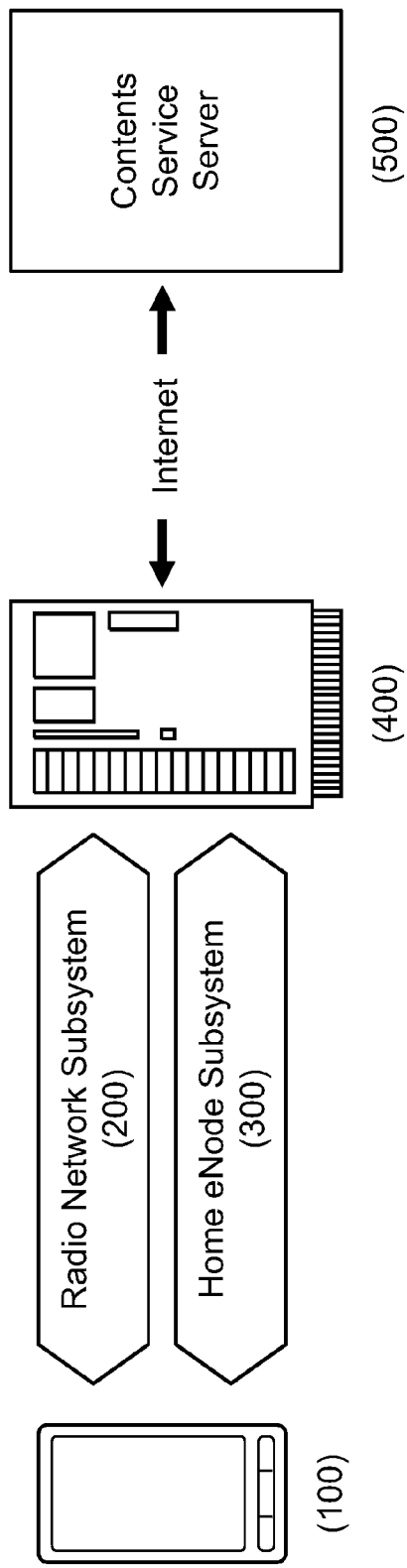
FIG. 10 is a view showing a configuration of a system according to an embodiment of the present invention.

FIG. 10 is a view showing a configuration of an LTE femtocell based content service system and a driving method thereof according to an embodiment of the present invention. The present invention includes a user equipment (UE) 100 connected to an EPC 400 network that is a core network through two routes, that is, a radio network subsystem (RNS) 200 and a HeNS 300 including a femtocell. The present invention connects an LTE femtocell-based content service server 500 to the EPC 400 network to provide information on the user equipment (UE) 100. Here, content provided from the content service server 500 to the user equipment (UE) 100 is provided from a subscriber that installs the LTE femtocell HeNB station or supplied from another content providers to build a database (DB) of the content service server 500.

When, for example, a subscriber of content provided to the user equipment (UE) 100 from the content service server 500 according to an embodiment of the present invention installs the LTE femtocell HeNB station in a workplace, the content may include service information, sales product information, and an advertisement provided from a workplace of the subscriber and also a large amount of data including a high-quality image from text or image information. Accordingly, the content service server 500 according to an embodiment of the present invention provides a content transmission service with reference to system information such as a downlink bandwidth (U_DL BW) and an amount of data of the user equipment (UE) 100 that is connected to the LTE femtocell HeNB station.

Figure 11:
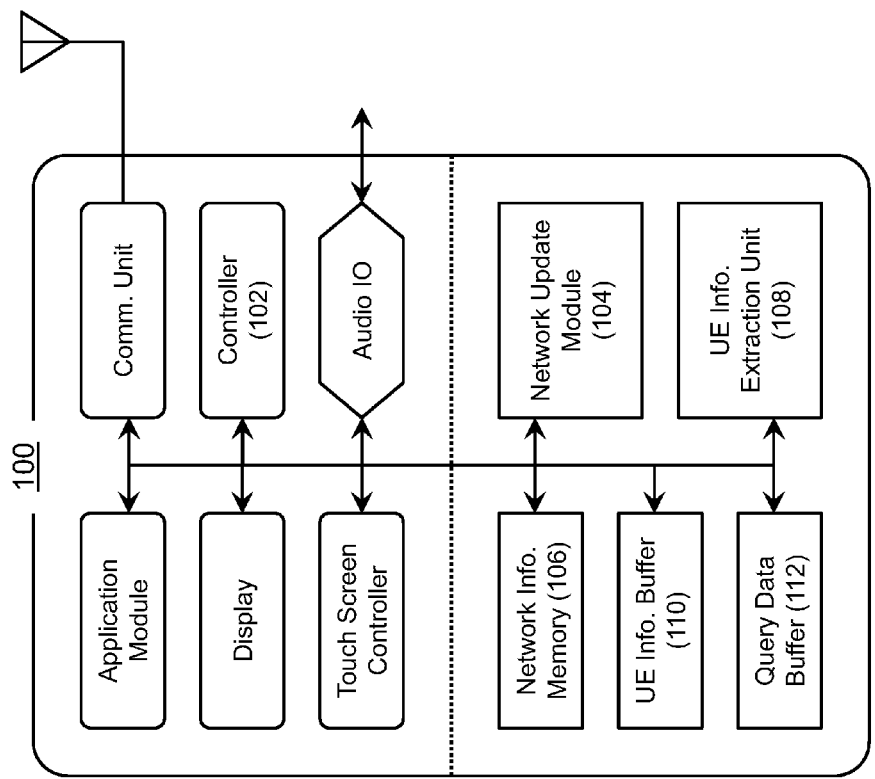
FIG. 11 is a view showing a configuration of a user equipment (UE) according to an embodiment of the present invention.

FIG. 11 is a view showing a configuration of a user equipment (UE) 100 for an LTE femtocell based content service system and a driving method thereof according to an embodiment of the present invention. The user equipment (UE) 100 according to an embodiment of the present invention is basically configured to include a controller 120, a communication unit configured to perform transmission and reception with a radio network subsystem (RNS) and HeNBs of a femtocell, a display, a touch screen controller configured to control a touch screen that is disposed to overlap the display, an audio input/output unit configured to input and output voice and audio signals, and an application module configured to store an application programs of the user equipment (UE) 100.

In the above configuration, the user equipment (UE) 100 according to an embodiment of the present invention includes a network update module 104 configured to update a configuration of a network that is selected using system information provided from the HeNB of the 3GPP E-UTRAN and a network information memory 106 configured to store information on a currently connected system. The user equipment (UE) 100 includes a user equipment information extraction unit 108 configured to extract system information of Physical Cell ID (PCI), user equipment's downlink bandwidth (U_DL BW), Cell ID, TAC, HeNB Name, and a signal-to-noise ratio (SNR) from the network information memory 106, a user equipment information buffer 110 configured to store the extracted system information, and a query data buffer 112 configured to store query data that is transmitted to the content service server 500 in addition to the system information of the user equipment information buffer 110.

Accordingly, the user equipment (UE) 100 according to an embodiment of the present invention reconfigures a network through the network update module 104 using system information provided from the HeNBs around the user equipment (UE) 100 under control of the controller 102 when the configuration of the network is changed, stores information on the reconfigured system in the network information memory 106, and connects the user equipment (UE) 100 to HeNB according to the network configuration. The user equipment (UE) 100 according to an embodiment of the present invention transmits system information, such as PCI, U_DL BW, Cell ID, TAC, HeNB Name, and SNR, of the user equipment information buffer 110 and query data of the query data buffer 112 to the content service server 500 under control of the controller 102 after connecting to the HeNB of the femtocell. The content service server 500 services the corresponding content based on the received system information and query data of the user equipment (UE) 100.

Here, query data defining service information provided from the content service server 500 with PCI, U_Cell ID, TAC, and HeNB is stored in the query data buffer 112 of the user equipment (UE) 100. As an example, if content to be received by the user equipment (UE) 100 from the content service server 500 is advertisement data, the query data is defined and set as a HeNB in order to provide only service information, sales product information, and an advertisement provided from a work place of a subscriber when the subscriber has installed the LTE femtocell HeNB station in the workplace. In addition, if the query data is defined as TAG, the user equipment (UE) 100 may receive its location service information including an LTE femtocell HeNB station of the subscriber. Accordingly, the user equipment (UE) 100 may limit a region of content that is serviced according to query data of the query data buffer 112.

Figure 12:
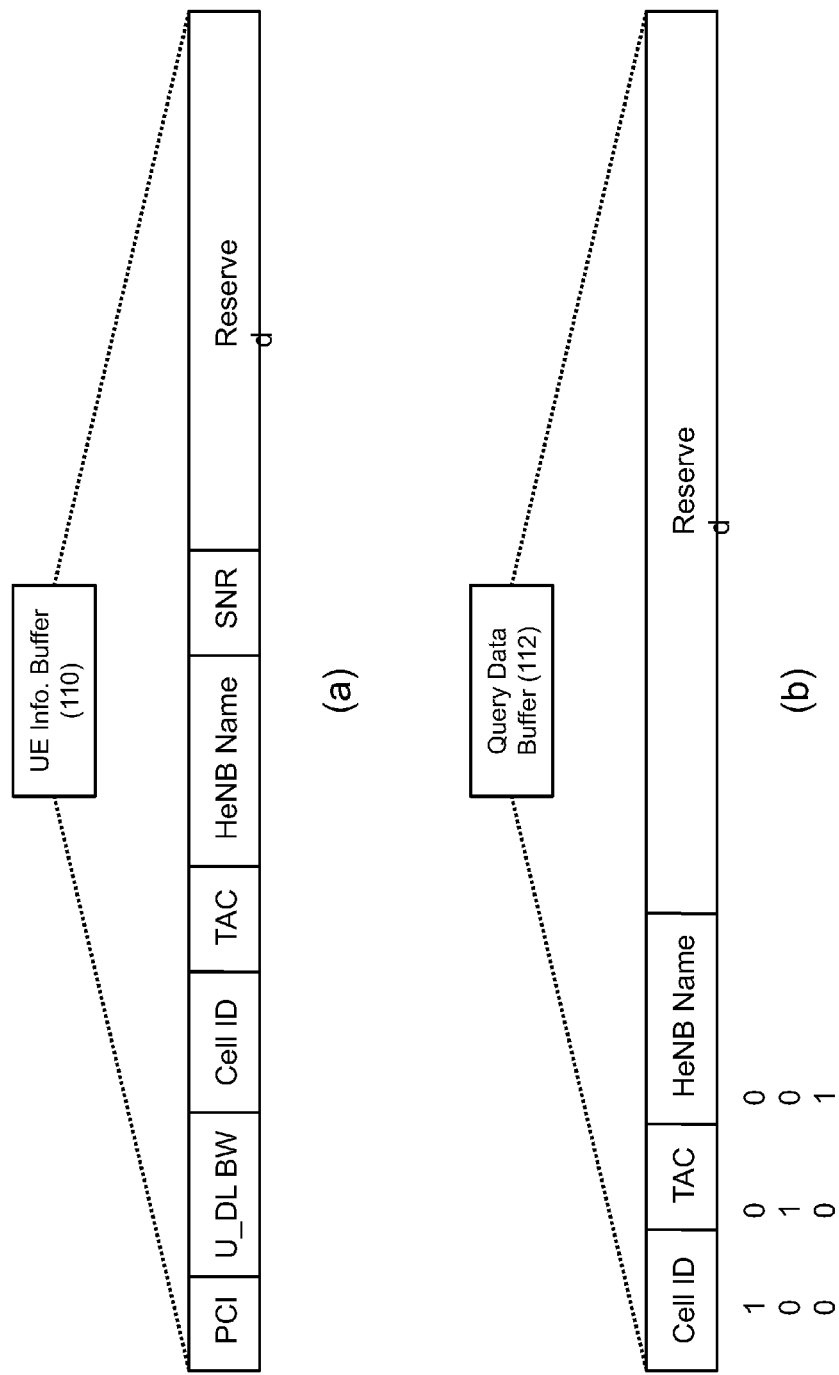
FIG. 12 is a view showing configurations of a query data buffer and a user equipment information buffer of a user equipment (UE) according to an embodiment of the present invention.

FIG. 12 is a view showing exemplary configurations of system information of a user equipment information buffer 110 of a user equipment (UE) 100 for the LTE femtocell based content service system and a driving method thereof according to an embodiment of the present invention. In (a) of FIG. 12, there is shown an exemplary configuration of the user equipment information buffer 110. The user equipment (UE) 100 connects to the HeNB of the femtocell, and then extracts system information, including PCI, U_DL BW, Cell ID, TAC, HeNB Name, and SNR, of the user equipment information buffer from the network information memory 106 to store the extracted system information in the user equipment information buffer 110.

In (b) of FIG. 12, there is shown an exemplary configuration of query data of the query data buffer 112. The query data buffer 112 includes a bit field, such as Cell ID, TAC, and HeNB Name. The bit field is set for the user equipment (UE) 100. Query data including the set bit field data may limit a corresponding region of content that is serviced by the content service server 500.

Figure 13:
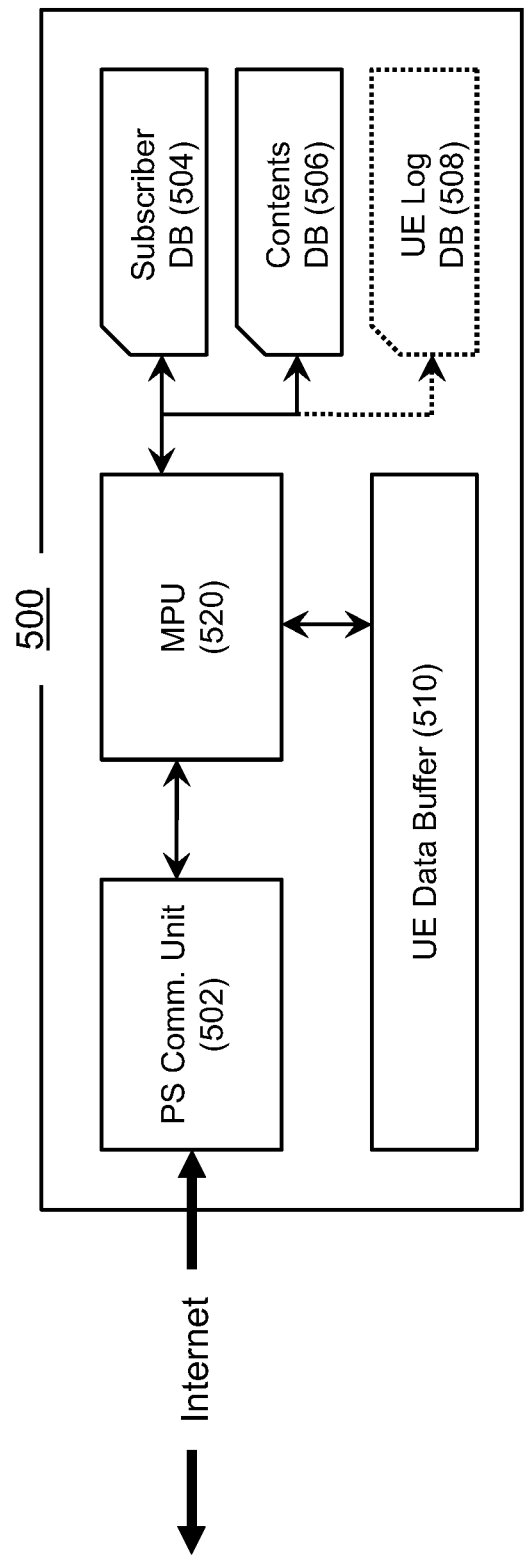
FIG. 13 is a view showing a configuration of a content service server according to an embodiment of the present invention.

FIG. 13 shows a configuration of a content service server 500 for an LTE femtocell based content service system and a driving method thereof according to an embodiment of the present invention. The content service server 500 according to an embodiment of the present invention includes a MPU 520 configured to perform control of the content service server 500 and a packet switching communication unit 502 for packet-switched (PS) communication with the core network using the MPU 520. The MPU 520 is connected with a user equipment data buffer 510 configured to store system information including PCI, U_DL BW, Cell ID, TAC, HeNB Name and SNR, and query data that are received from the user equipment (UE) 100. Furthermore, the MPU 520 is also connected to a subscriber DB 504 for storing HeNB station subscriber information, such as an ID of the LTE femtocell HeNB station, and a content DB 506 for storing content that is provided to the user equipment (UE) 100. In addition, the MPU 520 may further include a user equipment log DB 508 configured to store information on a history of the user equipment (UE) 100 connecting to the content service server 500 to receive an information providing service, and provide a connection history of the user equipment (UE) 100 by the query data transmitted from the user equipment (UE) 100.

Figure 14:
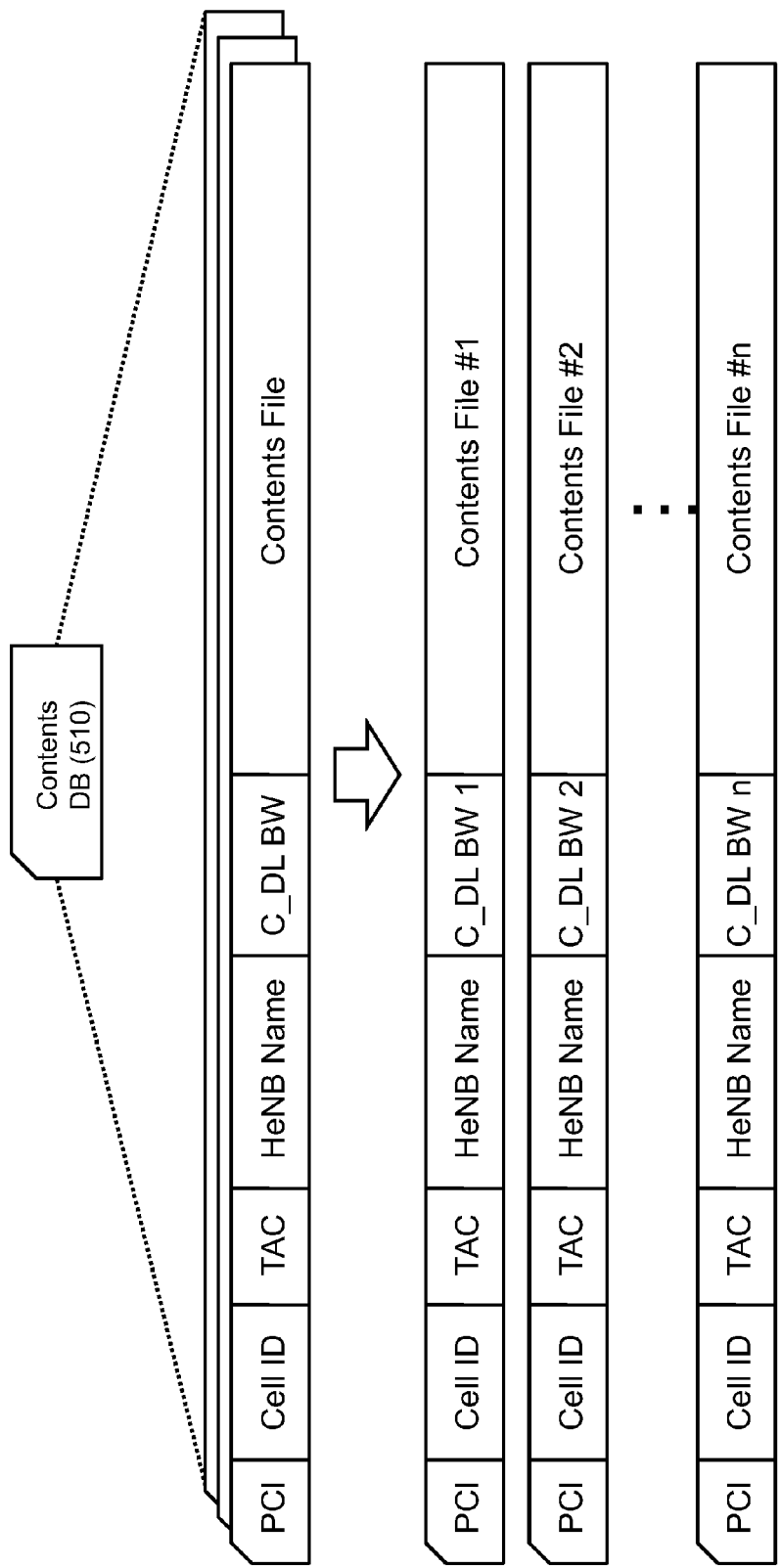
FIG. 14 is a view showing a structure of each piece of content stored in a content database (DB) according to an embodiment of the present invention.

FIG. 14 shows a configuration of each piece of content that is stored in the content DB 510 included in the content service server 500 for the LTE femtocell based content service system and the driving method thereof according to an embodiment of the present invention. As described above, the content provided from the content service server 500 according to an embodiment of the present invention includes text information, image information, and a large amount of data including a high-definition image. The content is selected based on PCI, Cell ID, TAC, or HeNB according to query data transmitted from the user equipment (UE) 100 and then provided. Accordingly, each piece of content stored in the content DB 510 includes a header having values of the PCI, Cell ID, TAC, and HeNB for a content file, allowing the content service server 500 to retrieve and provide content corresponding to the query data. In addition, the piece of content stored in the content DB 510 includes a header having a value of a content downlink bandwidth (C_DL BW). Content that can be transmitted is provided according to the system information of the user equipment (UE) 100. Accordingly, each piece of content stored in the content DB 510 is provided as a single file having a header of the values of PCI, Cell ID, TAC, HeNB, and C_DL BW, or a plurality of pieces of content are provided for C_DL BW with respect to the same PCI, Cell ID, TAC, and HeNB.

FIG. 15 is a corresponding example of a content downlink bandwidth according to a bit rate of the content DB 510 according to an embodiment of the present invention. This drawing shows an example of a correspondence between a bit rate and a value of a content downlink bandwidth (C_DL BW) according to a screen resolution and a compression scheme when the content provided from the content service server 500 is a video. In Master Information Block (MIB) of an LTE femtocell, a downlink bandwidth (DL BW) is defined as 1.4, 3, 5, 10, 15, 20 MHz. The content downlink bandwidth (C_DL BW) that can be transmitted is determined based on a unique bit rate of content. The C_DL BW is included in the header of each piece of content stored in the content DB 510 and referred to by the content service server 500.

Figure 16:
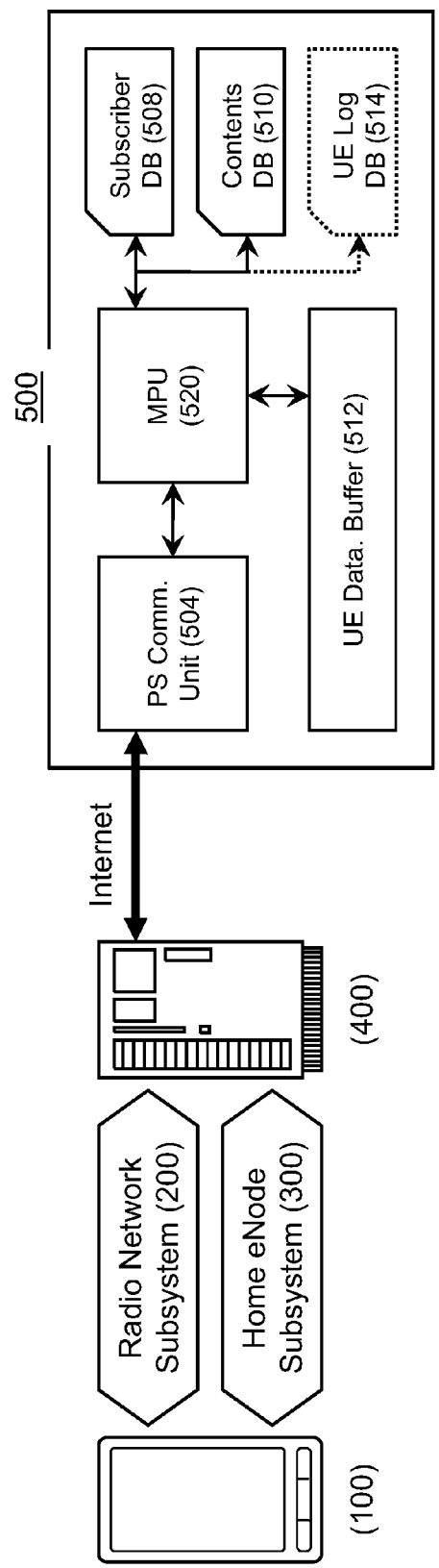
FIG. 16 is a view showing a configuration of an LTE femtocell based content service system according to an embodiment of the present invention.

FIG. 16 shows a configuration of an LTE femtocell based content service system according to an embodiment of the present invention. The user equipment (UE) 100 connects to the EPC 400 network that is a core network through routes, that is, the radio network subsystem (RNS) 200 and the HeNS 300 including a femtocell. The EPC 400 network is connected to the content service server 500 and configured to receive system information including PCI, U_DL BW, Cell ID, TAC, HeNB Name and SNR, and query data from the user equipment (UE) 100 to retrieve corresponding content with reference to the system information and query data and provide the retrieved content.

Figure 17:
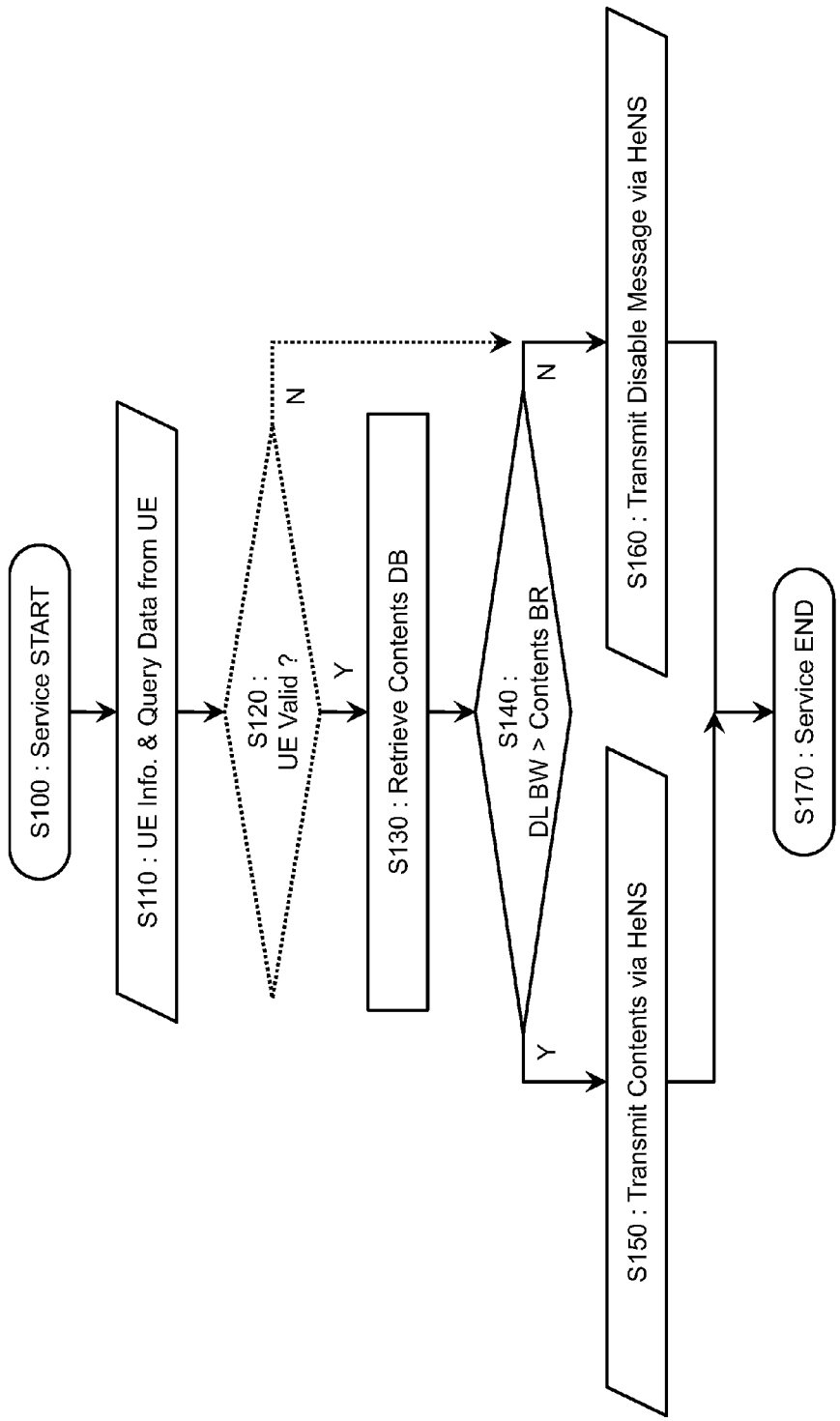
FIG. 17 is a flowchart showing a first driving method of an LTE femtocell based content service system.

FIG. 17 shows a flowchart of a first driving method of the LTE femtocell based content service system. A first driving method according to an embodiment of the present invention is a first driving method of an LTE femtocell based content service system in which the user equipment (UE) 100 connects to the EPC 400 network that is a core network through routes, that is, the radio network subsystem (RNS) 200 and the HeNS 300 including a femtocell, and the content service server 500 is connected to the EPC 400 network and configured to receive system information including PCI, U_DL BW, Cell ID, TAC, HeNB Name, and SNR and query data from the user equipment (UE) 100 and provide corresponding content with reference to the system information and the query data. The first driving method includes:

activating a content service server 500 (S100);
transmitting system information including PCI, U_DL BW, Cell ID, TAC, HeNB Name, and SNR and query data from the user equipment (UE) 100 to the content service server 500 through a route of the HeNS 300 (S110);
retrieving, by the content service server 500, corresponding content from the content DB 510 with reference to the received system information and query data (S130); and
comparing, by the content service server 500, U_DL BW of the user equipment (UE) 100 with a bit rate of the retrieved corresponding content (S140),
when the U_DL BW of the user equipment (UE) 100 is greater than the bit rate of the retrieved corresponding content in the comparing (S140), transmitting the retrieved corresponding content to the user equipment (UE) 100 through a route of the HeNS 300 (S150); and ending the process (S170); and when the U_DL BW of the user equipment (UE) 100 is less than the bit rate of the retrieved corresponding content in the comparing (S140), transmitting a service-disabled message to the user equipment (UE) 100 through the route of the HeNS 300; and ending the process (S170).

The first driving method of the LTE femtocell based content service system according to an embodiment of the present invention further includes, after the transmitting of the system information including PCI, U_DL BW, Cell ID, TAC, HeNB Name, and SNR and query data from the user equipment (UE) 100 to the content service server 500 through a route of the HeNS 300 (S110),
  determining whether the user equipment (UE) 100 is a service available terminal (S120),
  when an SNR value transmitted from the user equipment (UE) 100 is less than a reference SNR value set in the content service server 500, determining that the user equipment (UE) 100 is not the service available terminal, and transmitting a service-disabled message to the user equipment (UE) 100 through the route of the HeNS 300 (S160); and ending the process (S170); and
  when the SNR value transmitted from the user equipment (UE) 100 is greater than the reference SNR value set in the content service server 500 in the determining of whether the user equipment (UE) 100 is the service available terminal, determining that the user equipment (UE) 100 is the service available terminal (S120) and retrieving, by the content service server 500, corresponding content from the content DB 510 with reference to the received system information and query data.

Figure 18:
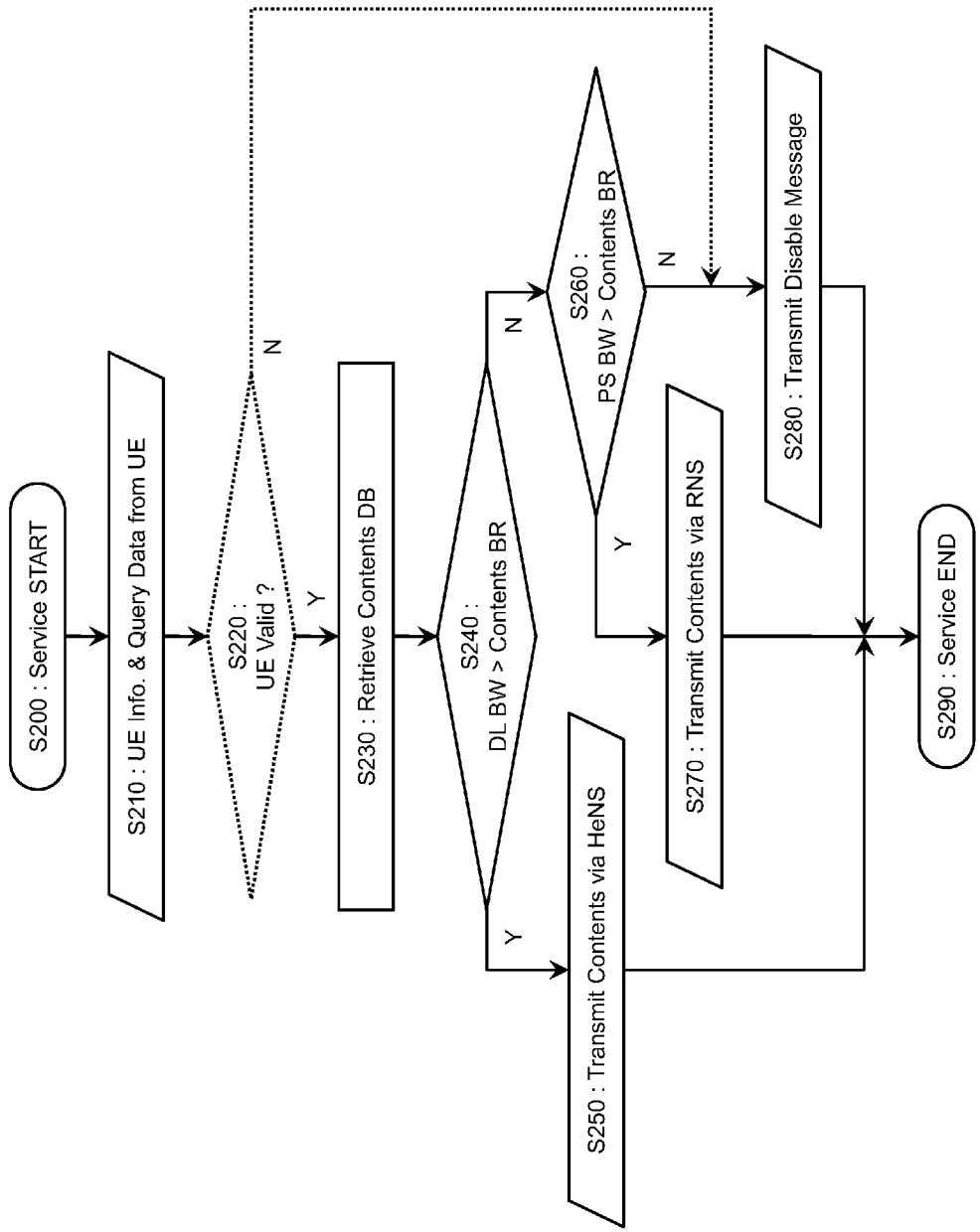
FIG. 18 is a flowchart showing a second driving method of an LTE femtocell based content service system.

FIG. 18 shows a flowchart of a second driving method of the LTE femtocell based content service system. A second driving method according to an embodiment of the present invention is a second driving method of an LTE femtocell based content service system in which the user equipment (UE) 100 connects to the EPC 400 network that is a core network through routes, that is, the radio network subsystem (RNS) 200 and the HeNS 300 including a femtocell, and the content service server 500 is connected to the EPC 400 network and configured to receive system information including PCI, U_DL BW, Cell ID, TAC, HeNB Name, and SNR and query data from the user equipment (UE) 100 and provide corresponding content with reference to the system information and the query data. The second driving method includes:
  activating a content service server 500 (S200);
  transmitting system information including PCI, U_DL BW, Cell ID, TAC, HeNB Name, and SNR and query data from the user equipment (UE) 100 to the content service server 500 through a route of the HeNS 300 (S210);
  retrieving, by the content service server 500, corresponding content from the content DB 510 with reference to the received system information and query data (S230);
  comparing, by the content service server 500, U_DL BW of the user equipment (UE) 100 with a bit rate of the retrieved corresponding content (S240),
  when the U_DL BW of the user equipment (UE) 100 is greater than the bit rate of the retrieved corresponding content in the comparing (S240), transmitting the retrieved corresponding content to the user equipment (UE) 100 through a route of the HeNS 300 (S250); and ending the process (S290).

The second driving method of the LTE femtocell based content service system according to an embodiment of the present invention includes:
  when U_DL BW of the user equipment (UE) 100 is less than a bit rate of the retrieved corresponding content in the comparison S240, comparing the bit rate of the retrieved corresponding content with a bandwidth of the radio network subsystem (RNS) 200 (S260);
  when the bandwidth of the radio network subsystem (RNS) 200 is greater than the bit rate of the retrieved corresponding content in the comparing of the bit rate of the retrieved corresponding content with the bandwidth of the radio network subsystem (RNS) 200 (S260), transmitting the retrieved corresponding content to the user equipment (UE) 100 through a route of the radio network subsystem (RNS) 200 (S270); and ending the process (S290); and
  when the bandwidth of the radio network subsystem (RNS) 200 is less than the bit rate of the retrieved corresponding content in the comparing of the bit rate of the retrieved corresponding content with the bandwidth of the radio network subsystem (RNS) 200 (S260), transmitting a service-disabled message to the user equipment (UE) 100 through a route of the HeNS 300 or a route of the radio network subsystem (RNS) 200 (S280); and ending the process (S290).

The second driving method of the LTE femtocell based content service system according to an embodiment of the present invention further includes, after the transmitting of the system information including PCI, U_DL BW, Cell ID, TAC, HeNB Name, and SNR and query data from the user equipment (UE) 100 to the content service server 500 through a route of the HeNS 300 (S210),
  determining whether the user equipment (UE) 100 is a service available terminal (S220),
  when an SNR value transmitted from the user equipment (UE) 100 is less than a reference SNR value set in the content service server 500, determining that the user equipment (UE) 100 is not the service available terminal, transmitting a service-disabled message to the user equipment (UE) 100 through the route of the HeNS 300 (S260); and ending the process (S270); and
  when the SNR value transmitted from the user equipment (UE) 100 is greater than the reference SNR value set in the content service server 500, determining that the user equipment (UE) 100 is the service available terminal in the determining of whether the user equipment (UE) 100 is the service available terminal (S220) and retrieving, by the content service server 500, corresponding content from the content DB 510 with reference to the received system information and query data.

As described above, the LTE femtocell based content service system and the driving method thereof that connect the user equipment (UE) 100 to the EPC 400 network that is a core network through routes, that is, a radio network subsystem (RNS) and a HeNS having a femtocell, receive system information including PCI, U_DL BW, Cell ID, TAC, HeNB Name and SNR, and query data from the user equipment (UE) 100 and provide corresponding content with reference to the system information and query data, thereby selectively providing a small amount of data including text, an image, and the like and a large amount of data including a high definition image to the user equipment (UE) through a femtocell network.

The LTE femtocell based content service system and the driving method thereof according to an embodiment of the present invention may include a content service server connected through a radio network subsystem (RNS) and a route of a HeNS having a femtocell and may receive system information including PCI, U_DL BW, Cell ID, TAC, HeNB Name and SNR, and query data from user equipment (UE) to provide corresponding content with reference to the system information and query data, thereby selectively providing a small amount of data including, for example, text, an image, and the like and a large amount of data including, for example, a high definition image to the user equipment (UE) through a femtocell network.

The LTE femtocell based content service system and the driving method thereof according to an embodiment of the present invention is described with reference to the limited embodiments and drawings, but the present invention is not limited thereto. It will be understood by those skilled in the art that various changes and modifications may be made within the spirit and scope of the appended claims and their equivalents of the present invention.

What is claimed is:

1. A long term evolution (LTE) femtocell-based content service system comprising:
   a user equipment (UE) connected to an evolved packet core (EPC) network that is a core network through one or more routes, that is, a radio network subsystem (RNS) and a home eNode subsystem (HeNS) having a femtocell to receive a public switched telephone newtwork (PSTN) and an Internet service for the user equipment (UE); and
   a content service server connected to the EPC network and configured to receive system information including physical cell Identification (PCI), user equipment's downlink bandwidth (U DL BW), Cell Identification (Cell ID), Tracking Area Code (TAC), home eNode B (HeNB) name, and signal-to-noise ratio (SNR), query data from the UE, retrieve corresponding content with reference to the query data and system information, and provide the retrieved content,
   wherein the content service server comprises:
   a microprocessor unit (MPU) configured to control the content service server; and
   a packet switching communication unit configured to perform packet switching (PS) type communication with the core network by the MPU, and
   wherein the MPU is connected to:
   a user equipment data buffer configured to store the system information including PCI, U_DL BW, Cell ID, TAC, HeNB Name and SNR, and the query data received from the user equipment (UE);
   a subscriber database (DB) configured to store HeNB station subscriber information in addition to an LTE femtocell HeNB station ID; and
   a content database (DB) configured to store pieces of content provided to the UE.

2. The LTE femtocell-based content service system of claim 1, wherein the UE comprises:
   a network update module configured to update a configuration of a selected network using the system information provided by HeNBs of the $3^{rd}$ Generation Partnership Project (3GPP) evolved universal terrestrial radio access network (E-UTRAN);
   a network information memory configured to store information on a currently connected system;
   a user equipment information extraction unit configured to extract the system information, including PCI, U DL BW, Cell ID, TAC, HeNB, and SNR, from the network information memory;
   a user equipment information buffer configured to store the extracted system information; and
   a query data buffer configured to store the query data transmitted to the content service server in addition to the system information of the user equipment information buffer.

3. The LTE femtocell-based content service system of claim 2, wherein the UE transmits the system information of the user equipment information buffer including PCI, U_DL BW, Cell ID, TAC, HeNB Name, and SNR from the user equipment information buffer and query data of the query data buffer to the content service server under control of a controller after connecting to a HeNB of the femtocell, and
   wherein the content service server services the corresponding content based on the received system information and query data of the UE.

4. The LTE femtocell-based content service system of claim 2, wherein the query data defining service information provided from the content service server with PCI, U_Cell ID, TAC, and HeNB is stored in the query data buffer.

5. The LTE femtocell-based content service system of claim 1, wherein the content service server comprises a user equipment log DB connected to the MPU and configured to store information on a history of the UE connecting to the content service server to receive an information providing service.

6. The LTE femtocell-based content service system of claim 1, wherein the content DB includes a header having values of PCI, Cell ID, TAC, and HeNB for each individual content file, and is configured to allow the content service server to retrieve and provide content corresponding to the query data of the UE.

7. The LTE femtocell-based content service system of claim 6, wherein the content DB includes the header having a value of a content downlink bandwidth (C_DL BW) for each individual content file to provide content to be transmitted according to the system information of the UE.

* * * * *